United States Patent [19]
Nicholson

[11] Patent Number: 5,913,672
[45] Date of Patent: Jun. 22, 1999

[54] CHUM DELIVERY ASSEMBLY

[76] Inventor: John R. Nicholson, 1204 Cactus St., Key Largo, Fla. 33303

[21] Appl. No.: 08/753,450

[22] Filed: Nov. 25, 1996

[51] Int. Cl.$^6$ .................................................. A01K 97/02
[52] U.S. Cl. .............................................. 43/44.99
[58] Field of Search ...................... 43/41, 44.99

[56] References Cited

U.S. PATENT DOCUMENTS

| | | | |
|---|---|---|---|
| 1,306,758 | 6/1919 | Godfrey | 43/44.99 |
| 2,928,202 | 3/1960 | Smerke | 43/44.99 |
| 2,941,327 | 6/1960 | Rundell | 43/44.99 |
| 3,083,492 | 4/1963 | Kling | 43/44.99 |
| 3,163,959 | 1/1965 | Hollar | 43/44.99 |
| 4,017,999 | 4/1977 | Muko | 43/44.99 |
| 4,065,870 | 1/1978 | Muko | 43/44.99 |
| 5,033,227 | 7/1991 | Coxwell | 43/44.99 |
| 5,131,183 | 7/1992 | Thayer | 43/44.99 |

FOREIGN PATENT DOCUMENTS

| | | | |
|---|---|---|---|
| 777144 | 11/1934 | France | 43/44.99 |
| 808439 | 2/1959 | United Kingdom | 43/44.99 |
| 2251776 | 7/1992 | United Kingdom | 43/44.99 |

*Primary Examiner*—Kurt Rowan
*Attorney, Agent, or Firm*—Malloy & Malloy, P.A.

[57] ABSTRACT

A chum delivery assembly for facilitating the rapid and strategic dispersement of chum along a bottom surface of a body of water in order to attract fish, the assembly including a containment member having a base, a surrounding wall surface, and an upper surface which together define an open interior chamber. The open interior chamber is structured to contain a quantity of chum therein, and a lowering line is included and structured to adjustably lower the containment member to a desired delivery location. The base of the chum delivery assembly includes a generally open configuration so as to permit the free passage of the chum therethrough from the open interior chamber, with a rigid panel being provided and disposed to selectively cover the base so as to prevent the free passage of chum through the base until desired. As such, the rigid panel is structured to be removed from a covering orientation over the base when the containment member is substantially at the delivery location such that all of the chum contained in the open interior chamber is released in a substantially concentrated manner at the delivery location.

7 Claims, 2 Drawing Sheets

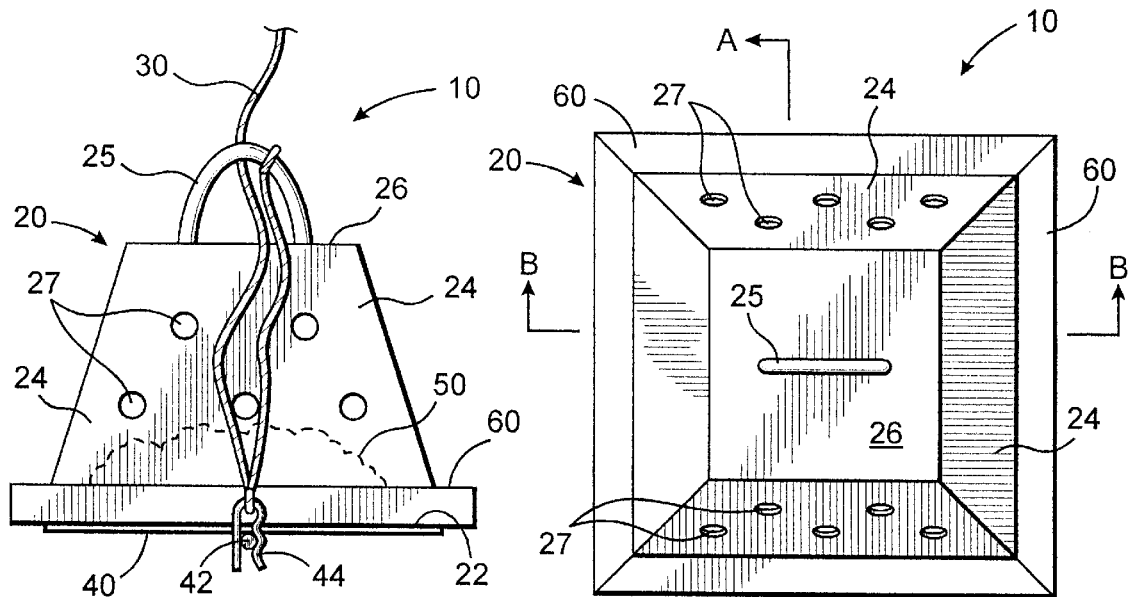
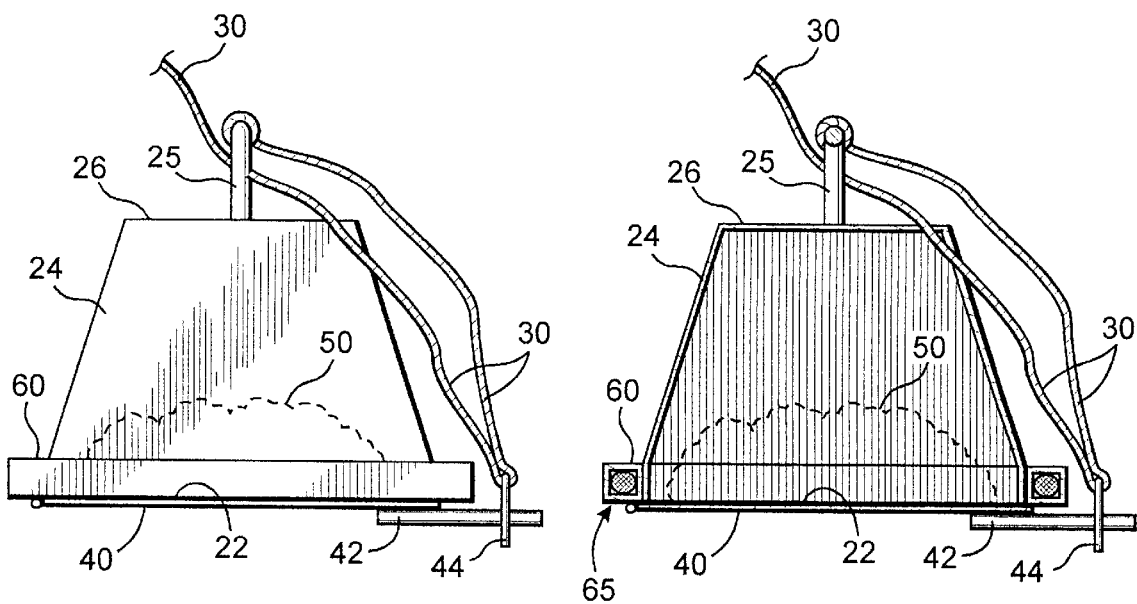

CHUM DELIVERY ASSEMBLY

BACKGROUND OF THE INVENTION

1. Field of the Invention

The present invention relates to a chum delivery assembly oriented towards facilitating the rapid yet controlled and strategic dispersement of various types of bait or chum in a concentrated manner along a bottom surface of a body of water in order to attract fish to the area. Furthermore, the present invention provides a chum delivery assembly oriented to be removed from the water immediately following release of the chum so that fish are not frightened away by the presence of the chum delivery assembly.

2. Description of the Related Art

Sport fishermen employ a variety of techniques to attract fish to an area of water. A commonly utilized approach is the dispensing of chum or bait in the water so as to attract fish within the immediate vicinity of the fishermen, such as near a pier, embankment, or a boat.

Sport Fishermen typically toss a quantity of chum directly into the water and allow it to disperse slowly through the water in an effort to attract fish to their general vicinity. Unfortunately, utilizing this approach is not very effective as much of the quantity of chum will be dispersed haphazardly and spread throughout a large area of water. Naturally, in this approach, there is a lack of a concentrated quantity of chum in one location in the water attracting fish and the chum is excessively diluted and dispersed so that its effectiveness is diminished. Moreover, the excessive dilution and dispersal of the chum is made worse due to the presence of currents, choppy waves, or other turbulent conditions at or near the surface of the water. Specifically, when chum is merely thrown into the water, before a majority of the chum has a chance to sink at that location, it is moved away from the location such that fish are not being precisely attracted to the vicinity of the fisherman.

In an effort to contain the chum in a somewhat more concentrated manner, others in the art have developed chumming devices which retain the quantity of chum within the device while it is immersed in the water. Such devices typically have vent openings sized so as to retain the chum within the device while permitting water to enter and exit the device, carrying the chum out of the device so as to attract fish while retaining the chum for a more gradual dispersement. Although such devices are more effective in concentrating the chum at a given location than merely tossing the chum over the edge of the boat or pier, the containment of chum within such existing devices in the water has several disadvantages.

First, although the fish may be initially attracted to the scent of the chum which permeates outside the device, the devices themselves are man-made structures to which game fish are unfamiliar and naturally skeptical in approaching. It is generally understood by fishermen that the presence of a chumming device in the water may itself deter certain species of game fish from approaching an area. In fact, while smaller fish will be attracted to the chum in such a device, larger gaming fish, which have been around a lot longer, have a tendency to stay well away from such man made devices, and the use of such a device does not actually aid in the catching of such larger fish. It is for that reason, that given the choice many fishermen prefer to toss loose chum directly into the water, despite the dispersal problems associated therewith, rather than utilize a chumming device.

An additional disadvantage associated with existing chumming devices is the fact that they do not generally provide larger quantities of loose chum which is freely accessible to fish. Specifically, sport fishermen will appreciate that chum located within an enclosed device underwater is not nearly as successful in attracting fish as is loose chum naturally disposed along the bottom surface of a body of water without a chumming device present. Simply put, larger and more accessible pieces of chum attract larger, more cautious fish. Moreover, some types of fish, which are naturally bottom feeders, will not be attracted to chum at the surface or suspended within a device.

Accordingly, it is seen that existing devices are inadequate in permitting chum to be strategically placed along a bottom surface of a body of water without limiting the size of the chum particles and without scaring off the fish due to the continued presence of an unfamiliar man made object. Additionally, as already described, merely tossing the chum into the water does not concentrate the chum within a small, defined fishing area, nor does it permit the chum to sink sufficiently at that defined fishing area so as to attract bigger fish since the chum will disperse and be substantially diluted when merely thrown into the water.

As such, there is a need in the art for a chum delivery assembly which permits a user to quickly and strategically dispense chum in a concentrated manner along a bottom surface of a body of water in order to attract fish to the area. More particularly, there is a need for a cost effective and durable chum delivery assembly which can rapidly release chum at a desired location well below the surface and be removed from the water immediately following release of the chum so that fish are not frightened away by the presence of a chum delivery assembly in the water.

SUMMARY OF INVENTION

The present invention is directed towards a chum delivery assembly for facilitating the rapid yet strategic dispersal of chum at a desired location at a bottom surface of a body of water in order to attract fish. Additionally, the chum delivery assembly of the present invention is structured to be quickly removable from the water immediately following the release of the chum so that fish are not frightened away by the presence of the chum delivery assembly in the water.

The chum delivery assembly of the present invention includes a containment member. The containment member, which is preferably of rigid construction, includes a base, a surrounding wall surface, and an upper surface, which together define an open interior chamber of the containment member. The open interior chamber is structured to contain a quantity of chum therein in a manner which provides for minimal seepage of the chum therefrom, while still effectively sinking in the water.

Furthermore, the chum delivery assembly includes lowering means. The lowering means are structured to adjustably and gradually lower the containment member to a delivery location where the chum can be released. In particular, the base of the containment member of the chum delivery assembly is structured to be generally open so as to permit the free passage of the chum therethrough from the open interior chamber of the containment member.

Disposed in covering relation over the base of containment member is are closure means. The closure means are structured to selectively cover the base of the containment member so as to prevent the free passage of chum through the base. Additionally, the closure means are structured to be removed from a covering orientation over the base when the containment member is substantially at the delivery location such that all of the chum contained in the open interior chamber is released in a substantially concentrated manner at the delivery location and the containment member can be pulled away.

It is an object of the present invention to provide a chum delivery assembly for facilitating the controlled and strategic release of chum at a particular desired delivery location at a bottom surface of a body of water in order to attract fish to that specific delivery location.

A further object of the present invention is to provide a chum delivery assembly structured to provide a quick and immediate release of the chum in a concentrated manner.

Another object of the present invention is to provide a chum delivery assembly structured so that the assembly may be retrieved immediately upon release of the chum to the delivery location, thereby minimizing the obtrusive effects of the assembly on marine life.

It is a further object of the present invention to provide a chum delivery assembly which permits the complete delivery of chum at a bottom surface of a body of water so as to maximize its concentrated release and its ability to attract fish to that particular delivery location.

Also an object of the present invention is to provide a chum delivery assembly that is easy to manipulate so as to release the chum in a controlled fashion.

These and other objects, features and advantages of the present invention will become more readily apparent from the attached drawings and the detailed description of the preferred embodiments, which follows.

BRIEF DESCRIPTION OF THE DRAWINGS

For a fuller understanding of the nature of the present invention, reference should be had to the following detailed description taken in connection with the accompanying drawings in which:

FIG. 1 is a front view of the chum delivery assembly;

FIG. 2 is a top view of the chum delivery assembly;

FIG. 3 is a side view of the chum delivery assembly;

FIG. 4 is a cross-sectional view of the chum delivery assembly taken along line A—A of FIG. 2.

Like reference numerals refer to like parts throughout the several views of the drawings.

DETAILED DESCRIPTION THE PREFERRED EMBODIMENT

Figure 5:
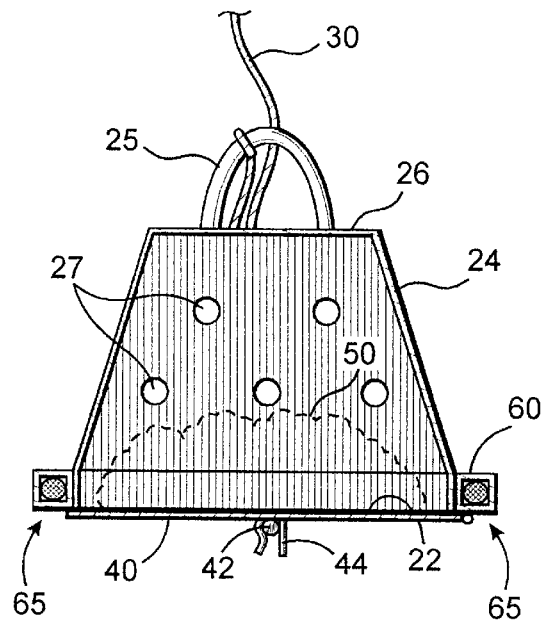
FIG. 5 is a cross-sectional view of the chum delivery assembly taken along line B—B of FIG. 2.

Shown throughout the figures, the present invention is directed towards a chum delivery assembly, generally indicated as 10. The chum delivery assembly 10, which is structured to effectively deliver chum to a fishing area in order to effectively attract a quantity of large fish to a specific fishing area, includes a containment member 20. In particular, the containment member 20 is preferably constructed of a strong, rigid, corrosion-resistant material such that it may be used and re-used over an extended period of time. Moreover, it is preferred that the material be substantially non-buoyant so that the containment member 20 is capable of more easily sinking when immersed in water. Along these lines, in the preferred embodiment, the containment member 20 of the chum delivery assembly 10 is constructed substantially of Aluminum. It should be appreciated, however, that a wide variety of other materials, including a durable plastic, may be utilized without departing from the present invention.

Looking specifically to the containment member 20, it includes a base 22, a surrounding wall surface 24, and an upper surface 26. Furthermore, defined in the containment member 20 by the base 22, the surrounding wall surface 24, and the upper surface 26, is an open interior chamber 21. The open interior chamber 21 is structured so as to contain a quantity of chum 50 therein for subsequent release in a baiting situation.

In the preferred embodiment, the surrounding wall surface 24 of the chum delivery assembly 10 includes a generally box-shaped configuration as shown in the figures. It should be appreciated, however, that the surrounding wall surface 24 may be configured in a wide variety of other shapes without departing from the instant invention. For example, the surrounding wall surface 24 may be formed in a conical, cylindrical, or triangular configuration. Further, the thickness of the surrounding wall surface 24 is preferably approximately 1/16th of an inch, although a variety of other thicknesses may also be utilized to meet particular needs.

Disposed throughout the surrounding wall surface 24 of the illustrated embodiment of the containment member 20 are a plurality of apertures 27. The apertures 27 are structured and disposed to permit water to enter the open interior chamber 21, thereby further ensuring that the containment member 20 sinks when dropped into a body of water. In the preferred embodiment, the apertures 27 are located only on two oppositely disposed sides of the surrounding wall surface 24, as best shown in FIG. 2, thereby providing sufficient fluid intake without creating excess turbulence within the open interior chamber 21 of the containment member 20 that could result in accidental, excessive and/or premature seepage of the chum 50 from the open interior chamber 21 of the containment member 20. Moreover, the apertures 27 are preferably formed in a generally circular configuration having a diameter of approximately 5/8th of an inch, thereby minimizing the presence of sharp edges and corners, and further minimizing the potential seepage of chum 50 therethrough. Alternatively, the apertures may be narrow rectangular slits formed in the surrounding wall surface 24. Those skilled in the art will appreciate that a variety of other shapes and sizes may be utilized for the apertures 27 which will accomplish a similar purpose without departing from the present invention. Moreover, if desired, the apertures can be omitted altogether.

Also in the preferred embodiment, the containment member 20 of the chum delivery assembly 10 includes a rib 60 extending around a perimeter of the bottom portion of the surrounding wall surface 24. The rib 60 will preferably be formed of hollow Aluminum tubing, although other shapes as well as non-corrosive and substantially non-buoyant materials may be utilized. In order to facilitate a faster sinking time for the chum delivery assembly 10 as well as added stability in the water, the rib 60 will include weights 65 disposed therein. In the preferred embodiment, the weights 65 will include #6 re-bar positioned within the rib 60 as shown in FIGS. 4 and 5.

Figure 6:
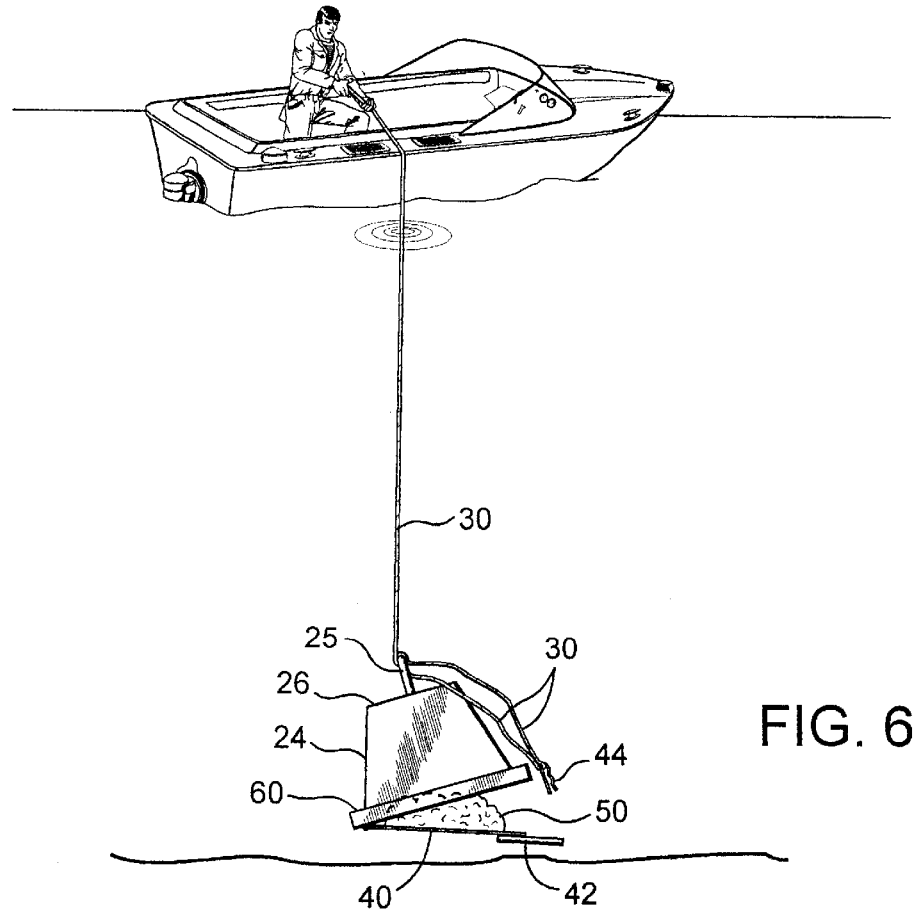
FIG. 6 shows the chum delivery assembly in use at a delivery location.

Looking specifically to the base 22 of the containment member 20, it is structured to be generally open so as to permit the free passage of the chum 50 therethrough from the open interior chamber 21. As such, the base 22 provides the primary means through which the chum 50 may exit the containment member 20 in a baiting situation. Additionally, however, the chum delivery assembly 10 of the present invention includes closure means. The closure means are structured to selectively cover the base 22 so as to prevent the free passage of the chum 50 through the base 22 until release of the chum 50 is actually desired. In this regard, the closure means are positionable between a covering orientation and an open orientation, with the closure means being configured so as to be removed from the covering orientation over the base 22 only when a user desires and the containment member 20 is substantially at the chosen delivery location 70, as best shown in FIG. 6. As such, all of the chum 50 contained in the open interior chamber can be selectively, and immediately released in a substantially concentrated manner at a chosen delivery location 70 well below the surface of the water and well below the dispersing effects of surface currents which could tend to move the larger concentrated quantities of chum far away from the precise fishing location. Furthermore, the closure means are structured to permit complete and rapid deployment so that the chum delivery assembly 10 can be retrieved from the water immediately following the release of the chum 50, a factor which can be quite significant when seeking to catch larger, more cautious fish. In the preferred embodiment, the delivery location 70 will be the underlying ground surface of the body of water, although the chum 50 may conceivably be released at any chosen depth within the body of water.

In the preferred embodiment, the closure means includes a rigid panel 40 sized to cover the base 22. The rigid panel 40 is preferably hingedly secured to the base 22 so as to pivotally move between the covering orientation and the open orientation. Latch means will be structured to engage the base 22 and the rigid panel 40 so as to maintain the rigid panel 40 in the covering orientation mentioned above. In the preferred embodiment, the latch means includes a substantially rigid rod 42. The rigid rod 42 will preferably be structured to removably extend through a retention segment 44 secured to the containment member 20 so as to remain substantially rigidly in place until removed to permit free movement of the rigid panel 40 into the open orientation. The rigid rod 42 is connected with an elongate line 46 so as to permit the rigid rod 42 to be pulled thereby out of the retention segment 44, by a user positioned at the water surface, and therefore allow the free movement of the rigid panel 40 to an open orientation releasing the chum 50 as best shown in FIG. 6.

The chum delivery assembly 10 further includes lowering means structured to adjustably lower the containment member 20 to the delivery location 70. In the preferred embodiment, the containment member 20 includes a mount segment 25 secured to an upper surface 26 of the containment member 20. Also in the preferred embodiment, the lowering means include a lowering line 30 secured to the mount segment 25 of the containment member 20. As such, a user situated above the water surface can effectively lower the chum delivery assembly 10 to a chosen delivery location 70, and subsequent to releasing the chum 50 can quickly and easily retrieve the chum delivery assembly 10 by pulling up on the lowering line 30.

In utilizing the chum delivery assembly 10, a user first deposits a quantity of chum 50 on the rigid panel 40 and secures the rigid panel 40 in the covering orientation over the base 22 of the containment member 20 by extending the rigid rod 42 through the retention segment 44. The chum delivery assembly 10 is then lowered by way of the lowering line 30 until the chum delivery assembly 10 is resting on the ground surface or until another desired delivery location 70 is attained. The user then pulls the elongate line 30 and therefore disengages the rigid rod 42 from the retention segment 44 so that the rigid panel 40 is free to rotate into its open orientation and immediately releases the chum 50 at the desired delivery location 70. The chum delivery assembly 10 can then be removed from the water by pulling on the lowering line 30.

Since many modifications, variations, and changes in detail can be made to the described preferred embodiment of the invention, it is intended that all matters in the foregoing description and shown in the accompanying drawings be interpreted as illustrative and within the scope and spirit of this invention, and not in a limiting sense. Thus, the scope of the invention should be determined by the appended claims and their legal equivalents.

Now that the invention has been described,

What is claimed is:

1. A chum delivery assembly comprising:
   a containment member, said containment member including a base, a surrounding wall surface, and an upper surface which define an open interior chamber,
   said open interior chamber being structured to contain a quantity of chum therein,
   lowering means structured and disposed to adjustably lower said containment member to an underlying surface at a delivery location,
   said base being generally open so as to permit the free passage of the chum therethrough from said open interior chamber,
   closure means structured to selectively cover said base so as to prevent the free passage of chum through said base, while also being structured to be removed from a covering orientation over said base upon said containment member being substantially at the underlying surface at the delivery location such that substantially all of the chum contained in said open interior chamber is released at a substantially concentrated location on the underlying surface at the delivery location,
   latch means including a substantially rigid rod structured to engage said base and said rigid panel so as to selectively maintain said closure means in said covering orientation, and
   said rigid rod being structured to removably extend through a retention segment secured to said containment member so as to remain substantially rigidly in place until removed to permit free movement of said rigid panel into said open orientation.

2. A chum delivery assembly as recited in claim 1 wherein said closure means includes a rigid panel sized to cover said base.

3. A chum delivery assembly as recited in claim 2 wherein said rigid panel is hingedly secured to said base so as to pivotally move between said covering orientation and an open orientation.

4. A chum delivery assembly as recited in claim 1 wherein said rigid rod is connected with an elongate line so as to permit said rigid rod to be pulled thereby out of said retention segment.

5. A chum delivery assembly as recited in claim 1 wherein said surrounding wall surface includes a plurality of apertures disposed therein and structured to permit fluid to enter said open interior chamber therethrough such that said containment member sinks, without permitting a substantial amount of the chum to exit said open interior chamber therethrough.

6. A chum delivery assembly as recited in claim 1 further including a lowering line secured to said containment member and structured to permit the gradual lowering thereof to the underlying surface at the delivery location.

7. A chum delivery assembly as recited in claim 6 further including a mount segment secured to said upper surface of said containment member and structured to be secured to said lowering line.

* * * * *